United States Patent [19]
Sasaki

[11] Patent Number: 5,233,683
[45] Date of Patent: Aug. 3, 1993

[54] PRINTER HAVING MEANS FOR CONVERTING RECEIVED FONT DATA IN ONE FORMAT INTO USABLE FONT DATA IN ANOTHER FORMAT

[75] Inventor: Ichiro Sasaki, Aichi, Japan

[73] Assignee: Brother Kogyo Kabushiki Kaisha, Nagoya, Japan

[21] Appl. No.: 813,791

[22] Filed: Dec. 26, 1991

[30] Foreign Application Priority Data

Jan. 10, 1991 [JP] Japan .................................. 3-1647

[51] Int. Cl.[5] ........................................... G06K 15/00
[52] U.S. Cl. ................................... 395/110; 375/115
[58] Field of Search ............... 395/110, 115, 164, 400, 395/148, 150; 400/69, 70, 61, 62; 358/444, 404; 340/735; 346/154

[56] References Cited

U.S. PATENT DOCUMENTS

| 4,277,835 | 7/1981 | Gakziera et al. | 385/164 |
| 4,441,164 | 4/1984 | Pavan et al. | 395/115 |
| 4,989,163 | 1/1991 | Kawamata et al. | 395/115 |
| 5,040,022 | 8/1991 | Kinoshita et al. | 355/206 |
| 5,093,903 | 3/1992 | Sadoh et al. | 395/110 |

FOREIGN PATENT DOCUMENTS 2217492 11/1989 United Kingdom ................ 385/110

Primary Examiner—Arthur G. Evans
Attorney, Agent, or Firm—Oliff & Berridge

[57] ABSTRACT

A printer adapted to receive from an external device printing data including character code data representative of characters to be printed, and font data defining characters in a predetermined typestyle. A converting device is provided to convert the received font data into converted font data which define the characters in the predetermined typestyle, in a format different from the format of the received font data, so that the characters represented by the character code data are printed according to the converted font data. The converted font data are sent to and stored in the external device, or alternatively the converted font data are stored in a non-volatile memory of the printer for storage therein even after removal of electric power from the printer, so that the converted font data in the external device or the non-volatile memory can be re-used.

14 Claims, 6 Drawing Sheets

PRINTER HAVING MEANS FOR CONVERTING RECEIVED FONT DATA IN ONE FORMAT INTO USABLE FONT DATA IN ANOTHER FORMAT

BACKGROUND OF THE INVENTION

1. Field of the Invention

The present invention relates in general to a printing apparatus, and more particularly to a printer which is adapted to store font data received from an external device such as a host computer and is capable of printing characters in a given typestyle according to the stored font data, in response to a printing command also received from the external device.

2. Discussion of the Prior Art

There is known a printing apparatus in which characters are printed in a desired typestyle according to a corresponding batch of font data received from an external device. More specifically, two or more batches of font data which define a family of characters in respective different typestyles received from the external device are stored in the printing apparatus, so that a desired text consisting of characters represented by character code data also received from the external device can be printed in a desired typestyle selected from among various typestyles, which include typestyles suitable for formal documents, letters of invitation to a wedding ceremony or announcement of death and Christmas cards. A considerable number of typestyles (for alphabetic characters, in particular) are available, and floppy disks storing font data for many typestyles are commercially available. Batches of font data for the desired typestyles are supplied from the external device to the printing apparatus, so that the printing may be effected in a desired one of the typestyles.

There are different formats in which such font data define characters in a given typestyle. For example, the font data take the form of dot data consisting of bits ("1" or "0") indicative of the presence or absence of dots which cooperate to define a character, or outline data representative of an outline of a character. In the case of the outline data, the character outline may be defined by Bezier curves, circular arcs, spline curves, etc. On the other hand, a certain printer is operable with font data prepared in some formats, while another printer is operable with font data prepared in the other formats. Namely, a printer is not capable of using font data prepared in a given format. In view of this drawback, there is proposed a printer which has a function of converting a batch of font data in a certain format into the corresponding font data in a format with which the printer is compatible. For instance, a batch of font data in the form of dot data is converted into the font data in the form of outline dat defining character outlines by Bezier curves, and the obtained outline data are stored in a random-access memory and used for printing.

In a printer having such font data converting function, the font data obtained by conversion and stored in the random-access memory are lost or erased when the printer is turned off with electric power removed. Consequently, the user has to feed the appropriate font data from the external device to the printer, for preparing the font data in the format with which the printer is compatible. Usually, the conversion of font data for an alphabetic font (a family of alphabetic characters) requires about five minutes, and the required time of conversion increases with the degree of precision of the conversion and the number of the characters of the relevant font.

Accordingly, the conventional printer indicated above suffers from a waste of time for frequent conversion of font data, and accordingly lowered printing efficiency. Where the user wishes to print a document in a comparatively short time, the user has to use font data for a typestyle which is not desired by the user and not suitable for a document to be prepared, since the font data available for the desired typestyle are formulated in a format with which the printer is not compatible. Thus, the font data converting function cannot be effectively utilized in the conventional printer.

SUMMARY OF THE INVENTION

It is therefore an object of the present invention to provide a printing apparatus which is easy to operate and has improved printing efficiency with a reduced time required for processing received font data prior to printing.

The above object may be accomplished according to the principle of the present invention, which provides a printing apparatus comprising: (a) input means for receiving from an external device printing data including character code data representative of characters to be printed, and font data which define characters in a predetermined typestyle; (b) font-data converting means for converting the font data received through the input means, into converted font data which define the characters in the predetermined typestyle, in a first format different from a second format in which the font data received through the input means define the characters; (c) printing means for printing the characters represented by the character code data, according to the converted font data in the first format; and (d) at least one of font-data output means for outputting the converted font data to the external device, for storage of the converted font data therein, and non-volatile memory means for storing the converted font data even after removal of electric power from the printing apparatus.

In the printing apparatus of the present invention constructed as described above, the characters represented by the character code data received through the input means are printed on a recording medium, by the printing means on the basis of the font data also received through the input means. If the font data received through the input means are prepared in the second format with which the printing means is not compatible, the received font data in the second format are converted into the font data in the first format, by the font-data converting means, so that the printing is effected according to the converted font data in the first format.

In the case where the font-data output means is provided, the converted font data in the first format obtained by the font-data converting means are sent to the external device for storage therein. Where the non-volatile memory means is provided, the font data in the first format are stored in the non-volatile memory means even after the apparatus is turned on. Both the font-data output means and the non-volatile memory means may be provided.

Where the font-data output means is provided, the font data prepared in the first format can be subsequently supplied to the printing apparatus when the user wants to effect printing in the typestyle of the relevant font data. Thus, the time otherwise required for the font-data converting means to obtain the font data in the first format can be eliminated. Further, the font data in the first format stored in the external device may be used for any other printing apparatus which does not have the font-data converting means of the present apparatus.

Where the non-volatile memory means is provided, the font data in the first format stored in that non-volatile memory can be utilized when needed. In this case, the apparatus does not require a time for receiving the font data from the external device, and a time for converting the received font data into the font data in the first format.

According to the present printing apparatus, the non-printing time spent in receiving and processing the font data from the external device can be significantly reduced, whereby the printing efficiency can be accordingly improved, and the characters can be printed in a selected one of various typestyles, with a relatively simple operating procedure.

The printing apparatus may further comprise determining means for determining whether the input format in which the font data received through the input means define the characters in the predetermined typestyle is the first format or the second format. If the input format is the second format, the font-data converting means operates to convert the font data received through the input means into the font data in the first format. This determination may be effected based on a font data format code which is received from the external device as part of the printing data and which indicates the input format, i.e., the format of the dot data received from the external device.

The "font data" may consist of a set of data defining a single character such as an alphabetic letter or symbol, or a batch of data defining a plurality of characters or a family of characters (e.g., all alphabetic characters of upper and lower cases).

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
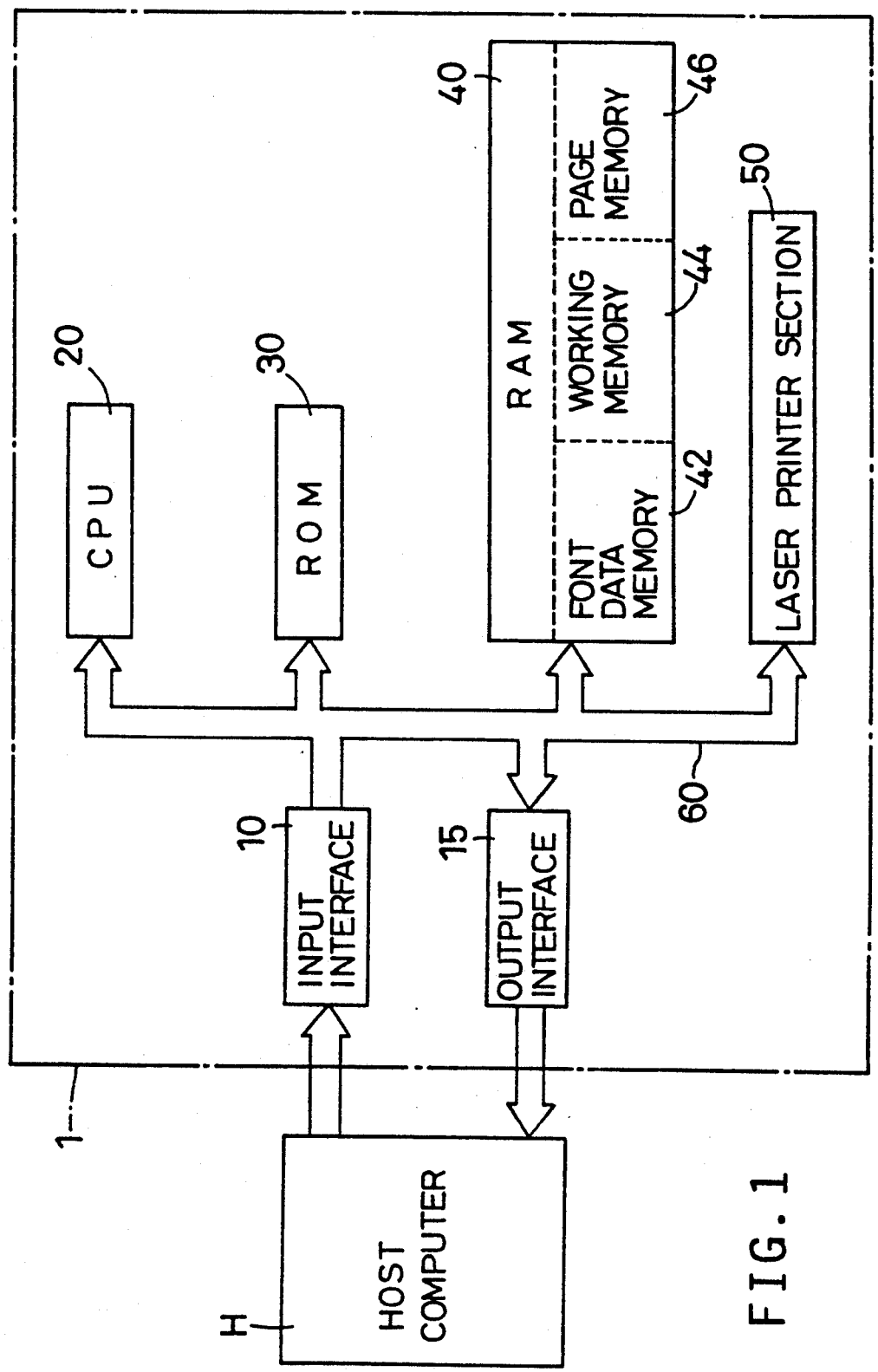
FIG. 1 is a schematic block diagram showing one embodiment of a printing apparatus of the present invention.

Referring first to FIG. 1, there is shown a printing apparatus in the form of a laser printer 1 connected to an external device in the form of a host computer indicated at H. The laser printer 1 is adapted to print images such as letters, symbols, numerals, graphic representations and other characters, on a suitable recording medium, according to printing data received from the host computer H. The laser printer 1 includes an input interface 10, an output interface 15, a central processing unit (CPU) 20, a read-only memory (ROM) 30, a random-access memory (RAM) 40, a laser printing section 50 and a bus 60 interconnecting the elements 10, 15, 20, 30, 40, 50.

The input interface 10 is connected to the host computer H, as input means for receiving the printing data which include character code data representative of characters to be printed, batches of font data defining characters in respective typestyles, font data format codes indicative of the format of the font data, and various control codes such as a carriage return code and a pagenation code.

The output interface 15 is also connected to the host computer H, as font-data output means through which font data prepared in a first format by conversion from the font data in a second format received from the host computer H are sent to the host computer H. The manner of conversion from the second format font data into the first format font data will be described in greater detail.

The CPU 20 has arithmetic and logic circuits and operates to control the laser printer 1 according to various control routines, as well known in the art.

The ROM 30 is a non-volatile memory storing control programs to be implemented by the CPU 20 for effecting various data processing and control operations to control the printer 1.

The RAM 40 includes a FONT DATA memory 42 for storing the font data received from the host computer H, a WORKING memory 44 for temporarily storing various kinds of data during data processing by the CPU 20, and a PAGE memory 46 for temporarily storing the printing data for one page of a text to be printed. The WORKING memory 44 has an input buffer for storing all kinds of printing data received from the host computer H from time to time.

The laser printing section 50 is adapted to print characters of each page of the text represented by the character code data of the printing data stored in the PAGE memory 40 As shown in U.S. Pat. No. 5,040,022 the disclosure of which is herein incorporated by reference, the printing section 50 has a photoconductive drum, and a laser scanning unit for imagewise electrostatically exposing the drum to a laser beam modulated according to a batch of font data which defines characters in a given typestyle. The modulated laser beam is deflected by a polygon mirror to scan the drum along the scanning line parallel to the axis of the drum. A toner is imagewise deposited on the drum according to a latent image electrostatically formed on the drum, and the toner is transferred to a recording medium which is fed by a suitable feeding device.

Figure 2:
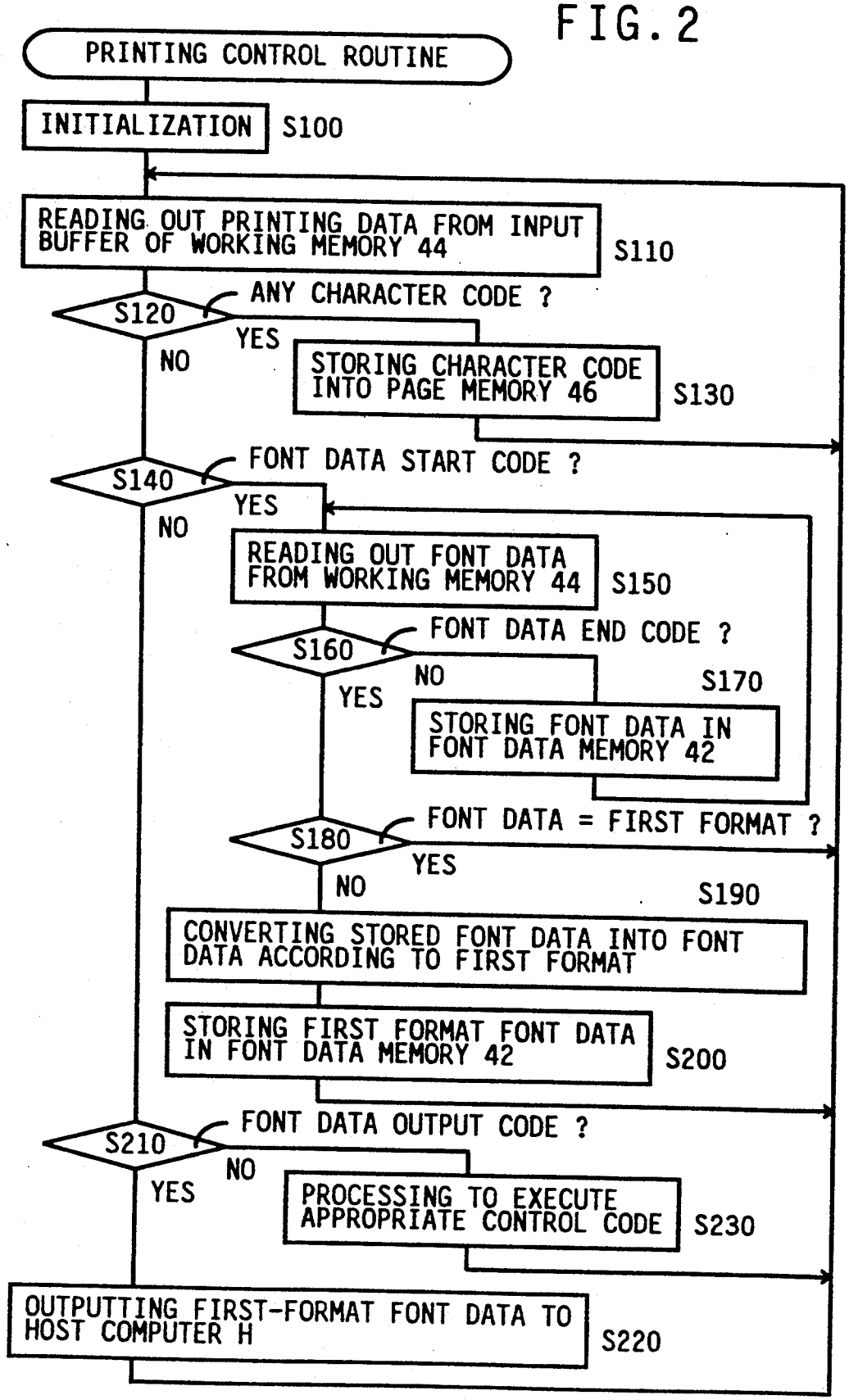
FIG. 2 is a flow chart illustrating a printing control routine implemented in the printing apparatus of FIG. 1.

Referring next to the flow chart of FIG. 2, there will be described a printing control routine to be implemented by the CPU 20 according to a control program stored in the ROM 30. This routine is initiated when power is applied to the laser printer 1.

The printing control routine starts with step S100 in which various elements of the printer 1 are initialized depending upon selected printing conditions such as character size, printing direction and printing area (right and left margin positions). After step S100, the input buffer of the WORKING memory 44 is ready to store the printing data as they are received from the host computer H through the input interface 17, during execution of the present printing control routine. Step S100 is followed by step S110 in which the leading set of the printing data currently stored in the input buffer of the WORKING memory 44 is read out. The control flow then goes to step S120 to determine whether or not the printing data set read from the input buffer is a character code.

If a character code has been read from the WORKING memory 44 in step S120, the control flow goes to step S130 to store that character code in the PAGE memory 46 of the RAM 40. Then, the control flow returns to step S110 to read out the next set of printing data from the input buffer of the WORKING memory 44.

If the data set read from the input buffer of the WORKING memory 44 in step S110 is not a character code, step S120 is followed by step S40 to determine whether or not the relevant data set is a font data start code which precedes a batch of font data.

If the data set read from the input buffer is a font data start code, step S140 is followed by step S150 to read out the next data set from the input buffer. The control flow then goes to step S160 to determine whether or not the data set read out in step S150 is a font data end code. If a negative decision (NO) is obtained in step S160, namely, if the data set read out in step S150 is a set of font data, step S170 is implemented to store the relevant font data set in the FONT DATA memory 42. The control flow then goes back to step S150. Steps S150, S160, S170 are repeatedly executed until the font data end code is read out in step S150, or an affirmative decision (YES) is obtained in step S160. Thus, the batch of font data between the font data start and end codes is stored in the FONT DATA memory 42.

If the font data end code has been read out from the input buffer of the WORKING memory 44, step S160 is followed by step S180 to determine whether or not the format in which the font data stored in the memory 42 define a family of characters in a given typestyle is a predetermined first format with which the present laser printer 1 is compatible. That is, the laser printer 1 is adapted to effect a laser printing operation according to font data prepared in the first format, which will be described. The determination in step S180 is effected on the basis of a font data format code which indicates the format of the font data. The font data format code precedes the batch of font data. If the format of the font data stored in the FONT DATA memory 42 is not the first format, then the control flow goes to step S190 in which the font data stored in the memory 42 are converted into font data in the first format, as described below. In this case, the format of the font data stored in the FONT DATA memory 42 will be referred to as "second format", which is different from the first format.

Step S190 is followed by step S200 in which the font data in the first format obtained in step S190 are stored in the FONT DATA memory 42. That is, the font data in the second format currently stored in the FONT DATA memory 42 are replaced by the font data in the first format. After completion of step S200, the control flow goes back to step S110.

If the printing data set read out in step S110 is not the font data start code, a negative decision (NO) is obtained in step S140, and step S210 is implemented to determine whether or not the relevant data set is a font data output code sent from the host computer H. If an affirmative decision (YES) is obtained in step S210, step S220 is executed in which batch of font data stored in the FONT DATA memory 42 (font data prepared in the predetermined first format) is sent to the host computer H through the output interface 15, so that the font data prepared in the first format by the present laser printer 1 are stored in the host computer H.

If a negative decision (NO) is obtained in step S210, namely, if the printing data set read out in step S110 is any one of the control codes such as the carriage return code, pagenation code and margin set codes, the control flow goes to step S230 in which the function corresponding to the relevant control code is performed. When the pagenation code is recognized in step S210, the laser printing section 50 is operated to print one page of a text, according to the character code data stored in the PAGE memory 46 and the font data stored in the FONT DATA memory 42. The characters to be printed on that page are represented by the character code data, and the typestyle of the printed characters is defined by the font data.

After step S220 or S230, the control flow goes back to step S110. Thus, the present printing control routine is repeatedly executed until the printer 1 is turned off with the electric power removed therefrom.

Figure 3A:
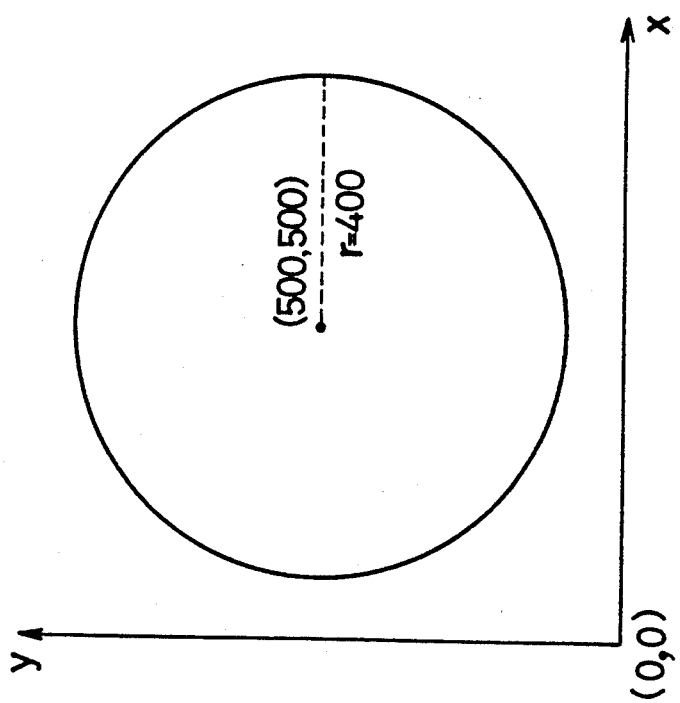
FIGS. 3(A) and 3(B) are views explaining conversion of font data from one format to another, in the apparatus of FIG. 1.
Figure 3B:
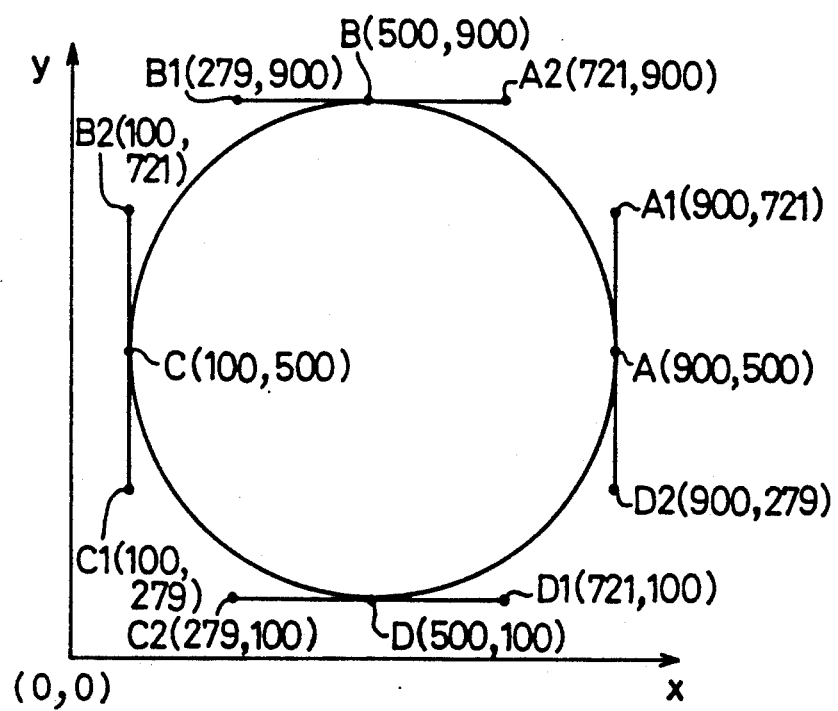

Referring to FIGS. 3(A) and 3(B), there will be described the manner of conversion of the font data in step S190. FIG. 3(A) shows a circle defined by font data according to the second format, while FIG. 3(B) shows a circle defined by font data according to the first format with which the present laser printer 1 is compatible. The first format of FIG. 3(B) uses straight lines and third-order Bezier curves to define the outlines of the characters in a given typestyle.

According to the second format as shown in FIG. 3(A), the circle is defined by a circular arc or arcs in an x-y coordinate system. In this specific example of FIG. 3(A), the circle is defined by the arc which has a center at the x-axis and y-axis coordinates (500, 500), a radius of 400, a start point angle of 0° and an end point angle of 360°. However, the present laser printer 1 is not operable to effect printing according to font data prepared in the second format as shown in FIG. 3(A). In other words, the printer 1 is compatible with the font data prepared in the first format as shown in FIG. 3(B).

Therefore, if the format of the font data received from the host computer H is the second format, the received font data in the second format should be converted into the corresponding font data in the first format in which the character outlines are defined by straight lines and Bezier curves as shown in FIG. 3(B), so that the printing by the printing section 50 is effected according to the font data in the first format.

The conversion of a circular arc into a corresponding Bezier curve necessarily suffers from a conversion error to some extent. The error is considerable particularly where a circle is approximated by one single Bezier curve. To minimize the conversion error, the circle is divided into four circular arcs AB, BC, CD and DA, as indicated in FIG. 3(B), and each of these four arcs is approximated by a third-order Bezier curve which is represented by a start point, an end point, and two control points. For example, the circular arc AB is defined by a start point A (900, 500), an end point B (500, 900), and two control points A1 (900, 721) and A2 (721, 900). Similarly, the circular arc BC is defined by a start point B (500, 900), an end point C (100, 500) and two control points B1 (279, 900) and B2 (100, 721), while the circular arc CD is defined by a start point C (100, 500), an end point D (500, 100) and two control points C1 (100, 279) and C@ (279, 100). The circular arc DA is defined by a start point D (500, 100), an end point A (900, 500) and two control points D1 (721, 100) and D2 (900, 279).

Since the end point of one of the four Bezier curves is the same as the start point of the next Bezier curve, each Bezier curve can be expressed by three points, i.e., start point and two control points.

While the circle in FIG. 3(B) is a simple example, outlines of some characters have complicated curved segments which should be defined by many Bezier curves. Accordingly, the format conversion of font data requires a long time.

In the known printer, the conversion of the font data from an incompatible format into a compatible format should be effected each time the font data are received in the incompatible format. Consequently, a considerable time should be spent in this conversion before the printing operation according to the converted font data is initiated.

In the present laser printer 1, the batch of font data in the second format received from the host computer H is converted into the corresponding batch of font data in the first format, and the font data batch in the first format is sent to and stored in the host computer H, in response to the font data output code received from the host computer H. Therefore, the batch of font data in the first format stored in the host computer H can be subsequently used, namely, supplied to the printer 1 in place of the font data prepared in the second format, so that the printer 1 is operated according to the font data in the first format. Thus, once the second format font data are converted by the printer 1 into the first format font data, a text can be printed by the printer 1 in the typestyle as defined by the font data in the first format supplied from the host computer H, without the conventionally required conversion of the second format font data into the first format font data. Accordingly, the non-printing time used for the conversion is significantly reduced, to thereby improve the printing efficiency. Further, the user is not forced to use a batch of font data in the compatible first format, which defines the characters in an undesired typestyle. Thus, the present laser printer 1 permits the user to effect printing of a text in a desired one of the typestyles represented by respective batches of font data all prepared in the compatible first format.

It is noted that the batches of font data in the first format which are prepared by the printer 1 and stored in the host computer H can be utilized for other printers which do not have a font data converting function. Thus, the present printer 1 serves to improve the function of the other printers used in connection with the host computer H. Presently, font data in different formats compatible with various printers are available from various manufacturers. The present printer 1 permits such printers to be connected to the host computer H, for performing printing operations in the desired typestyles, according to font data obtained by conversion from the various font data formats by the present printer 1.

Although the present first embodiment has the input interface 10 and the output interface 15 for data reception from and data transmission to the host computer H, the printer 1 may use an input/output interface for bidirectional data communication with the host computer H.

Figure 4:
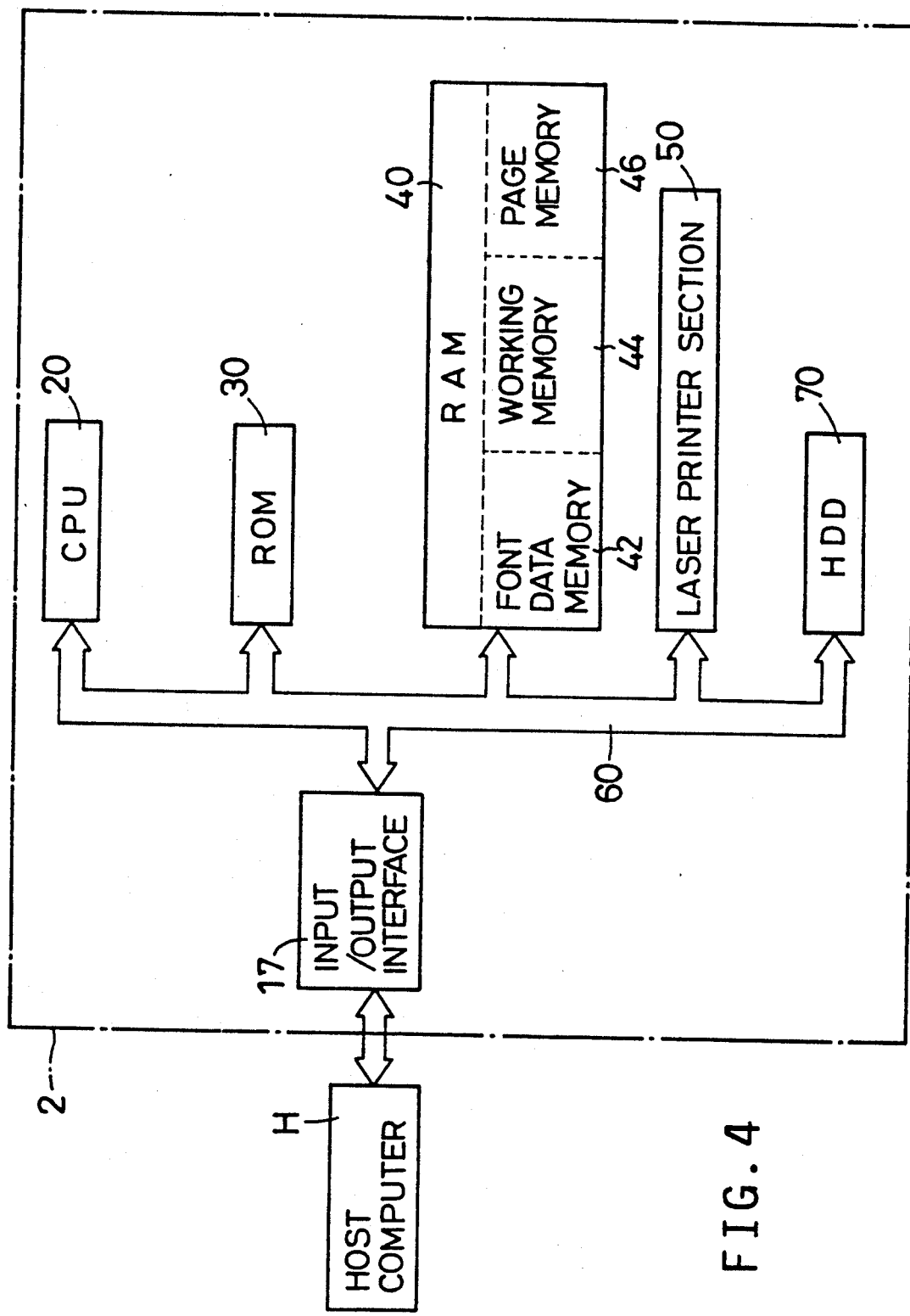
FIG. 4 is a schematic block diagram of a second embodiment of the printing apparatus of the invention.
Figure 5:
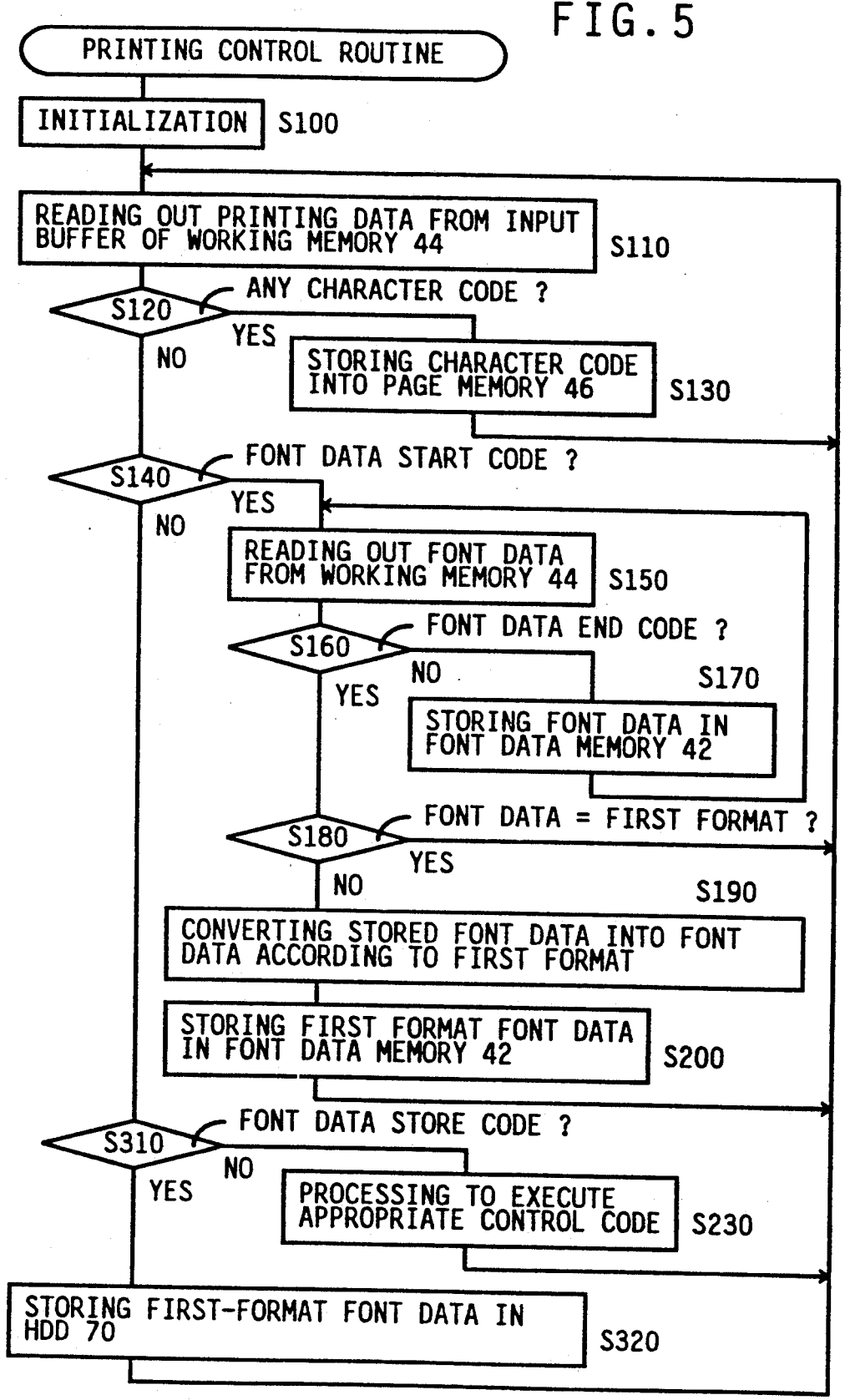
FIG. 5 is a flow chart illustrating a printing control routine implemented in the apparatus according to the second embodiment of FIG. 4.

Referring next to FIGS. 4 and 5, there will be described a second embodiment of this invention. In FIG. 4, the same reference numerals as used in FIG. 1 are used to identify the functionally corresponding elements.

The laser printer according to the second embodiment, indicated at 2 in FIG. 4, includes an input/output interface 17 for bidirectional data communication with the host computer H, and a hard disk drive device (HDD) 70, in addition to the CPU 20, ROM 30, RAM 40, laser printing section 50 and bus 60 which have been described with respect to the first embodiment. The HDD 70 is a non-volatile memory capable of storing font data in the first format obtained by conversion from font data in the second format received from the host computer H. The font data stored in this non-volatile memory will not be lost or erased even after the printer 2 is turned off.

Referring to the flow chart of FIG. 5, there will be described a printing control routine of the laser printer 2, which is initiated when the printer 2 is turned on. This printing control routine of FIG. 5 is identical with that of the first embodiment of FIG. 2, except for steps S310 and S320 which are executed in place of steps S210 and S220 of FIG. 2, respectively.

If the printing data set read out in step S110 is not the font data start code, a negative decision (NO) is obtained in step S140, whereby step S140 is followed by step S310 to determine whether or not the relevant data set is a font data store code received from the host computer H. If an affirmative decision (YES) is obtained in step S310, the control flow goes to step S320 in which the font data in the first format stored in the FONT DATA memory 42 in step S170 or S200 are stored in the HDD 70, in response to the font data store code which is entered by the user through the host computer H. Step S320 is followed by step S110.

In the present embodiment, the font data in the first format obtained in step S190 and stored in the FONT DATA memory 42 in step S200 is stored in the hard disk device HDD 70, rather than outputted to the host computer H. The font data in the HDD 70 can be subsequently utilized by the printer 2, without receiving the corresponding font data in the second format from the host computer H and without the font data conversion in step S190. Consequently, various font data prepared in respective different formats received from the host computer H can be used by the printer 2, and the printing can be achieved at high printing efficiency, with reduced non-printing time.

While the present invention has been described in its presently preferred embodiments, it is to be understood that the invention is not limited to the details of the illustrated embodiments, but may be embodied with various changes, modifications and improvements, which may occur to those skilled in the art, without departing from the spirit and scope of the invention defined in the following claims.

What is claimed is:

1. A printing apparatus comprising:
   input means for receiving from an external device printing data including character code data representative of characters to be printed, and font data which define a family of characters that are different from each other, in a predetermined typestyle;
   font-data converting means for converting said front data received through said input means, into converted font data which define the characters in said predetermined typestyle, in a first format different from a second format in which the font data received through said input means define said family of characters, said first and second formats being respective different manners in which said font data are formulated;

printing means for printing the characters represented by said character code data, according to said converted font data in said first format; and at least one of (a) font-data output means for outputting said converted font data to said external device, for storage of said converted font data in said external device, and (b) non-volatile memory means for storing said converted font data even after removal of electric power from said printing apparatus.

2. A printing apparatus according to claim 1, further comprising determining means for determining whether an input format in which said font data received through said input means define the characters in said predetermined typestyle is said first format or said second format, and wherein said font-data converting means operates in response to said determining means, to convert the font data received through said input means into said converted font data in said first format, if said input format is said second format.

3. A printing apparatus according to claim 2, wherein said printing data further include a font data format code indicative of said input format, and said determining means determines, on the basis of said font data format code, whether said input format is said first format or said second format.

4. A printing apparatus according to claim 1, wherein said input means is connected to a host computer constituting said external device, to receive said printing data, said font-data output means sending said converted font data to a non-volatile memory provided in said host computer.

5. A printing apparatus according to claim 1, wherein said non-volatile memory means consists of a disk storage.

6. A printing apparatus according to claim 1, further comprising input-font-data memory means for temporarily storing the font data received through said input means, and converted-font-data memory means for temporarily storing said converted font data in said first format.

7. A printing apparatus according to claim 6, wherein said converted-font-data memory means has a storage capacity for storing a batch of said converted font data which defines a multiplicity of characters in said predetermined typestyle, and said font-data output means outputs at one time said batch of the converted font data to said external device.

8. A printing apparatus according to claim 6, wherein said converted-font-data memory means has a storage capacity for storing a batch of said converted font data which defines a multiplicity of characters in said predetermined typestyle, said apparatus further comprising means for storing said batch of the converted font data into said non-volatile memory means.

9. A printing apparatus according to claim 6, wherein said input-font-data memory means and said converted-font-data memory means are constituted by a font data memory, said apparatus further comprising means for reading out from said font data memory the font data in said second format received through said input means, commanding said font-data converting means to convert said font data in said second format into said converted font data in said first format, and storing said converted font data in said font data memory.

10. A printing apparatus according to claim 9, wherein a storage area of said font data memory in which said font data in said second format are stored is used for storing said converted font data in said first format.

11. A printing apparatus comprising:

input means for receiving from an external device printing data including character code data of representative characters to be printed, and font data which define a family of characters that are different from each other, in a predetermined typestyle;

font-data converting means for converting said font data received through said input means, into converted font data which define the characters in said predetermined typestyle, in a first format different from a second format in which the font data received through said input means define said family of characters, said first and second formats being respective different manners in which said font data are defined;

printing means for printing the characters represented by said character code data, according to said converted font data in said first format; and font-data output means for outputting said converted font data to said external device, for storage of said converted front data in said external device.

12. A printing apparatus according to claim 11, wherein said external device comprises a host computer which has a non-volatile memory for receiving said converted front data from said font-data output means.

13. A printing apparatus comprising:

input means for receiving from an external device printing data including character code data of representative characters to be printed, and font data which define a family of characters that are different form each other, in a predetermined typestyle, said font data representing an outline of each character of said family of characters;

font-data converting means for converting said font data received through said input means, into converted font data which define the characters in said predetermined typestyle, in a first format different from a second format in which the font data received through said input means define said family of characters, said first and second formats being respective different manners in which said outline of said each character is defined;

printing means for printing the characters represented by said character code data, according to said converted font data in said first format; and one of (a) font-data output means for outputting said converted font data to said external device, for storage of said converted font data in said external device, and (b) non-volatile memory means for storing said converted font data even after removal of electric power from said printing apparatus.

14. A printing apparatus according to claim 13, wherein said at least one of said font-data output means and said non-volatile memory means consists of said font-data output means.

* * * * *